United States Patent [19]

Wahli et al.

[11] 4,222,661
[45] Sep. 16, 1980

[54] PROCESS AND APPARATUS FOR PRINTING TRANSPARENCIES

[75] Inventors: Robert Wahli, Unterengstringen; Jürgen Pinkert, Marly, both of Switzerland

[73] Assignee: Gretag Aktiengesellschaft, Regensdorf, Switzerland

[21] Appl. No.: 884,977

[22] Filed: Mar. 9, 1978

[30] Foreign Application Priority Data

Mar. 11, 1977 [CH] Switzerland .................. 3097/77

[51] Int. Cl.$^2$ ............................................. G03B 27/78
[52] U.S. Cl. ...................................... 355/38; 355/68; 355/77
[58] Field of Search ...................... 355/38, 68, 77, 83, 355/88

[56] References Cited

U.S. PATENT DOCUMENTS

| | | | |
|---|---|---|---|
| 3,482,916 | 12/1969 | Mey et al. | 355/38 |
| 3,585,029 | 6/1971 | Neale | 355/38 X |
| 3,653,759 | 4/1972 | Klein | 355/38 |

Primary Examiner—L. T. Hix
Assistant Examiner—W. J. Brady
Attorney, Agent, or Firm—Burns, Doane, Swecker & Mathis

[57] ABSTRACT

A method for controlling exposure in the direct printing of color transparencies, the method comprising comparing the neutral density of an original transparency required to be printed with a reference transparency to obtain a measure of the difference in neutral density, this difference then being used to control the exposure time. Control is effected by increasing the exposure time for that portion of the density difference which exceeds a first positive limit by a predetermined amount which is less than the increase in exposure time required by the positive density difference below the first positive limit and decreasing the exposure time for that portion of the density difference which is less than a second negative limit by a predetermined amount which is less than the decrease in exposure time required by the negative density difference above the second negative limit. Apparatus for carrying out the method comprises a printing light source for illuminating the original and the reference transparencies and circuitry for obtaining the neutral density difference. Filters for interposing between the light source and the original transparency are controlled by a non-linear circuit which determines the amount by which the exposure is to be increased or decreased by the above predetermined amounts.

13 Claims, 8 Drawing Figures

PROCESS AND APPARATUS FOR PRINTING TRANSPARENCIES

FIELD OF THE INVENTION

This invention relates to a method of and apparatus for printing of colour transparencies.

In by far the majority of cases, paper prints of transparencies are conventionally indirectly produced using an interneg on negative paper.

More recently, reversal papers of satisfactory quality have become commercially available which make it possible to print transparencies directly and thus obviate the intermediate interneg step.

Theoretically, reversal prints from transparencies can be produced similarly and by similar equipment to prints from negatives. An important consideration, however, is that the gradation pattern and density range of transparencies differ considerably from the corresponding characteristics of negatives, the gradation curves being much steeper and the density range being greater. The gradation curve of a transparency can be compensated for by choosing a reversal paper with the right gradation to achieve a good overall gradation, but the density range has to be dealt with by the exposure system and exposure control of the printer.

The exposure system is subject to physical limitations making it difficult to design it in any way that differs considerably from the system used for printing negatives of comparable format.

Consequently, problems arising from the differences between the density range of transparencies and that of negatives must be solved virtually in their entirety by exposure time control. These problems are that very underexposed transparencies need very long exposure times and very overexposed transparencies need very short exposure times. In both cases colour anomalies may occur due to reciprocity failure. (Schwarzschild effect). Since the Schwarzschild exponent may differ for each colour component, there are unwanted deviations from the neutral colour balance, a defect known to the skilled addressee as "clipping" of the emulsion. Very long exposure times impair the performance of the printer, while when the conventional colour shutter systems are used in which filters are pivoted into and out of the path of the beam from the light source, very short exposure times may result in non-uniform exposure of the paper print due to variations in the dwell time of the shutter filter above each dot of the image. These small differences in dwell time become more important in proportion as the required exposure time is shorter.

PRIOR ART

In an endeavour to reduce these unwanted effects, one commercially available apparatus has features for restricting the exposure time range; a circular graduated filter of neutral colouring is provided in the exposure beam path and at the beginning of each exposure starts to rotate through 360° from its maximum-density position. Consequently, the printing light in the plane of the paper is relatively weak to start with and increases as the exposure proceeds—i.e. the printing light is at a minimum at the beginning of exposure and at a maximum at the end of exposure. Consequently, variations in the density of the original do not have to be compensated for just by variations in exposure time but can be dealt with to some extent by varying the intensity of the printing light.

There are two disadvantages of this system. First, the outlay on apparatus for graduated filters, a motor drive and control are considerable, and secondly since the available light can only be reduced by the filter the average exposure times become longer and the printer therefore becomes less efficient. Another disadvantage is that, since the intensity of the printing light varies in time, automatic printers using such a system can operate only with a measuring system providing time integration of a value proportional to printing light intensity. This limitation reduces flexibility.

OBJECT OF THE INVENTION

It is an object of this invention to provide a process and an apparatus which obviate very short and very long exposure times in the reversal printing of transparencies.

It is the intention to fully utilize the available printing light and achieve optimally short exposure times and therefore high printer efficiency. Another object is to improve the colour quality of the prints prepared from originals of extreme total density, and to provide all these advantages with a reduced financial outlay.

SUMMARY OF THE INVENTION

The invention relates to a process for controlling exposure in the direct printing of transparencies on to a print material comprising determining the difference in neutral density between an original transparency to be printed and a reference transparency; establishing a first positive limit and a second negative limit for the determined density difference; for the proportion by which the density difference exceeds the first positive limit, increasing the time during which the original transparency is exposed to printing light for printing on a print material by a predetermined amount which is less than the amount of increase in exposure time required by a positive density difference below said first positive limit and; for the proportion by which the density difference is less than the second negative limit, decreasing the time during which the original transparency is exposed to printing light for printing on a print material by a predetermined amount which is less than the amount of decrease in exposure time required by a negative density difference above the second negative limit.

The invention also relates to an apparatus for performing the process. The apparatus comprises a printing light source, a support for the original to be printed, a support for photo-sensitive reversal material, an imaging lens, servo-operated colour control filters and an automatic exposure control acting thereon, the control comprising: first means for determining the colour densities of the original in the three primary colours; second means for determining the neutral density of the original to be printed; and third means which lengthen or shorten the exposure times in the three primary colours from the values for a reference original in dependence upon the variations of the neutral density and of the colour densities from the corresponding values of a reference original; according to the invention the exposure control has fourth means which respond to the difference between the neutral density of the original to be printed and the neutral density of the reference original and which oppose at least to some extent a further lengthening and/or shortening of the exposure time when such difference exceeds a first positive limit and/or falls short of a second negative limit.

The advantages of the invention in printing underexposed transparencies is that with effect from a particular density of the original the exposure time remains substantially constant, so that printer efficiency can be higher than in the conventional process. Tests have shown that this feature causes very little impairment of print quality as regards density and, indeed, improves print colouring.

So far as the printing of over-exposed transparencies is concerned, the invention provides the advantages that the minimum exposure time can be at a value which is still not critical as regards the non-uniform dwell time of the shutter filters in and out of the beam path, and that the avoidance of very short exposure times does not cause untrue colouring of neutral low-density shades and pastel shades.

BRIEF DESCRIPTION OF THE DRAWINGS

A preferred embodiment of the invention will be described in greater detail hereinafter with reference to the drawings wherein.

DETAILED DESCRIPTION OF THE PREFERRED EMBODIMENT

Figure 1:
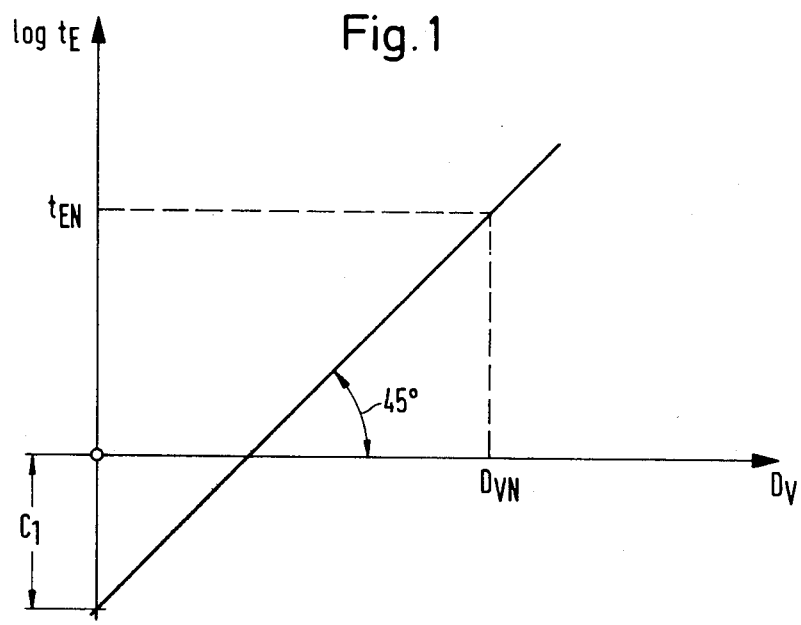
FIGS. 1 to 4 are various diagrams which help to explain a process according to the invention.

Referring to FIG. 1, $D_v$ represents the overall density of an original or part thereof and is calculated in accordance with the formula:

$$D_v = log(1/T) = -log\ T \qquad (1)$$

from the mean transmission T of the complete original or the part thereof defined as important to the image. In Anglo Saxon literature the density $D_v$ according to (1) is called LADT (large area transmission density).

In the diagram of FIG. 1 the logarithm of the exposure time, log $t_E$, is plotted as ordinate.

Figure 2:
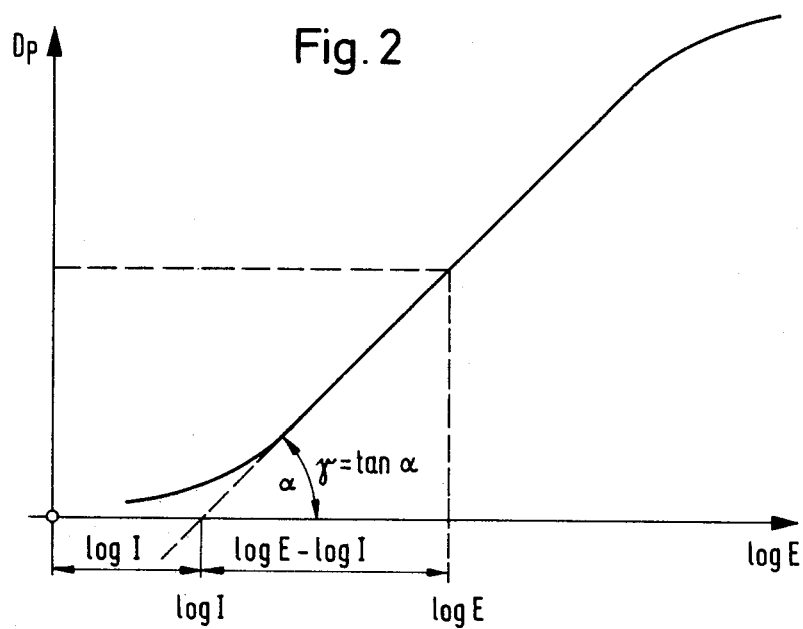

So that a constant printing density $D_p$ may prevail on the printing material independently of the density $D_v$ of the original, there must be compliance with the formula:

$$D_p = \gamma(log\ E - log\ I) = const \qquad (2)$$

which applies to the linear part of the characteristic H and D curve. This formula is illustrated in draft form in FIG. 2 where:

$\gamma$—denotes the so-called gradation or gradient, which is a constant for a particular material;

I—denotes the so-called inertia representing that Evalue which (theoretically) leads to the positive density D=0, and E—denotes the so-called exposure as a yardstick for the quantity of light incident on the printing material. E is given by the formula:

$$E = B_o \cdot T \cdot t_E = I_E \cdot t_E \qquad (3)$$

where $B_o$ denotes the light intensity illuminating the original, T denotes the mean transmission of the original as defined above and $t_E$ denotes the duration of effect (exposure time) of the resulting printing light intensity $I_E$.

It follows from formulas (2) and (3) that:

$$D_p = const. = \gamma(log(B_o \cdot T \cdot t_E) - log\ I) \qquad (4)$$

or $$log\ B_o + log\ T + lot\ t_E = (1/\gamma)\ const + log\ I$$

or $$log\ t_E = (1/\gamma)const. + log\ I - log\ B_o - log\ T \qquad (5)$$

i.e.

$$log\ t_E = C_l + D_v \qquad (6)$$

with $$C_1 1/\gamma\ const. + log\ I - log\ B_o \qquad (7)$$

$C_1$ is a system constant depending on the printing material ($\gamma$, I) and the lighting system ($B_o$)

As will be apparent from formula (6) variations of the density $D_v$ can be compensated for by proportional variations of the exposure time log $t_E$, as shown in graph form in FIG. 1. An exposure time $t_{EN}$ corresponds to the normal of an original having the density $D_{VN}$.

Figure 3:
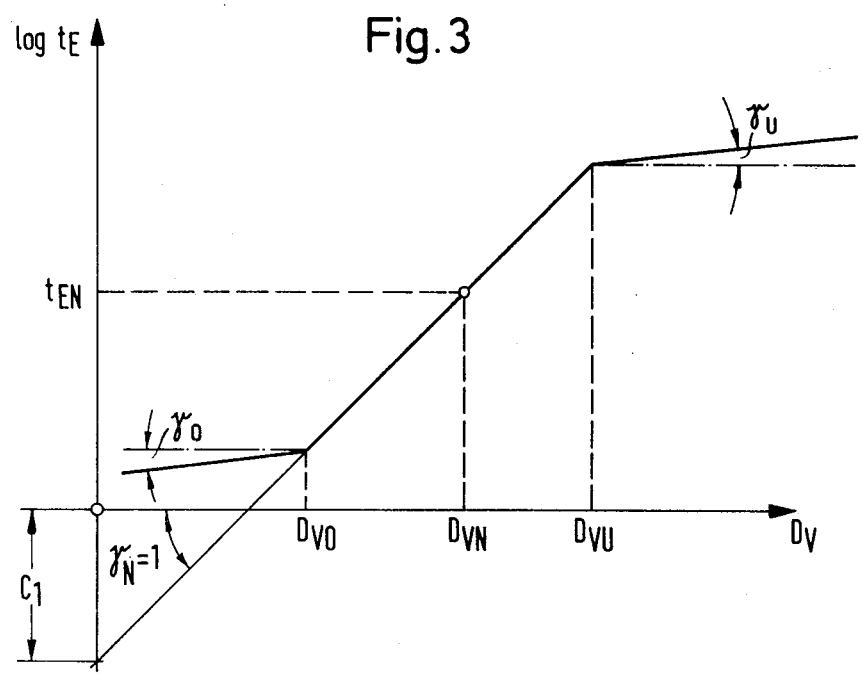

FIG. 3 shows how the process according to the invention affects the exposure time. With effect from a predetermined original density $D_{VU}$ greater than the normal density $D_{VN}$ and representing an under-exposed transparency, there is only a minor increase in the exposure time $t_E$. In other words, there is deliberate non-conpliance with the reciprocity formula (6) in the density range $D_V > D_{VU}$. It is possible to speak here of a density under-correction (sub-proportional density compensation, $\gamma_U < \gamma_N$).

Similarly, the exposure time $t_E$ can remain substantially constant below a density $D_{VO}$ of the original < the normal density $D_{VN}$. Here again the effect corresponds to a density under-correction (sub-proportional density compensation, $\gamma_O < \gamma_N$) in the range concerned.

FIG. 3 shows how very long and very short exposure times are cut down in the required manner. All in all, very under-exposed transparencies are printed too dark and very over-exposed transparencies are printed too light.

For practical requirements it may be convenient to modify the log $t_E$ straight line between the abscissa points $D_{VO}$ and $D_{VU}$ by a kink at the normal point $D_{VN}$. Of course, a kink or bend of this kind, known to the skilled addressee as a "kinked slope", can provide improved compensation for non-linearities of the photographic system, leading to an improvement in print quality.

Figure 4:
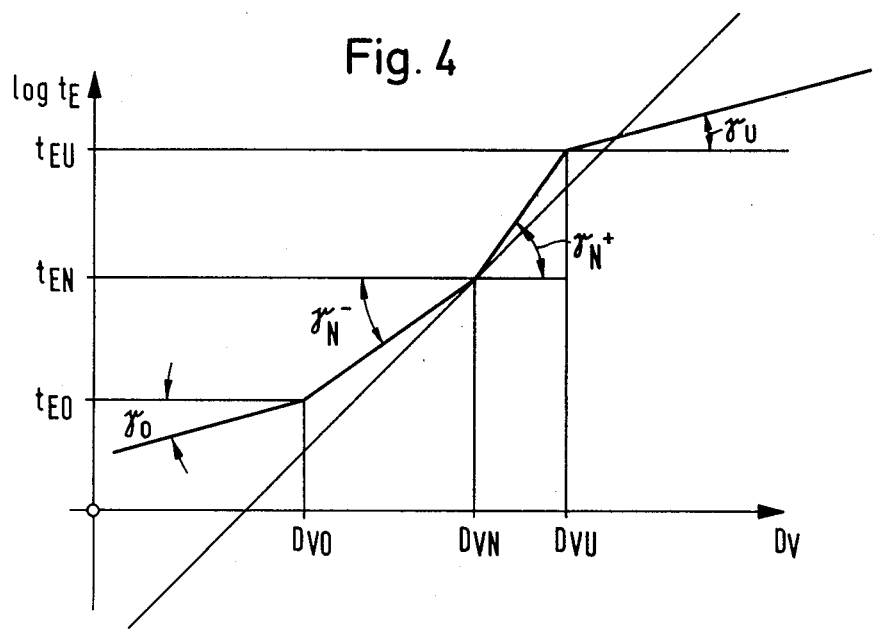

FIG. 4 shows that the process according to the invention is of use in printing systems working with a variety of kinked slopes. The kink or bend points $D_{VU}$ and $D_{VO}$ are determined in practice by considerations of timing. The time $t_{EU}$ determining the point $D_{VU}$ represents substantially the longest exposure time acceptable on the grounds of efficiency, while the time $t_{EO}$ determining the point $D_{VO}$ depends upon the times required to pivot the particular colour shutter filters used in and out of the beam path.

Figure 5:
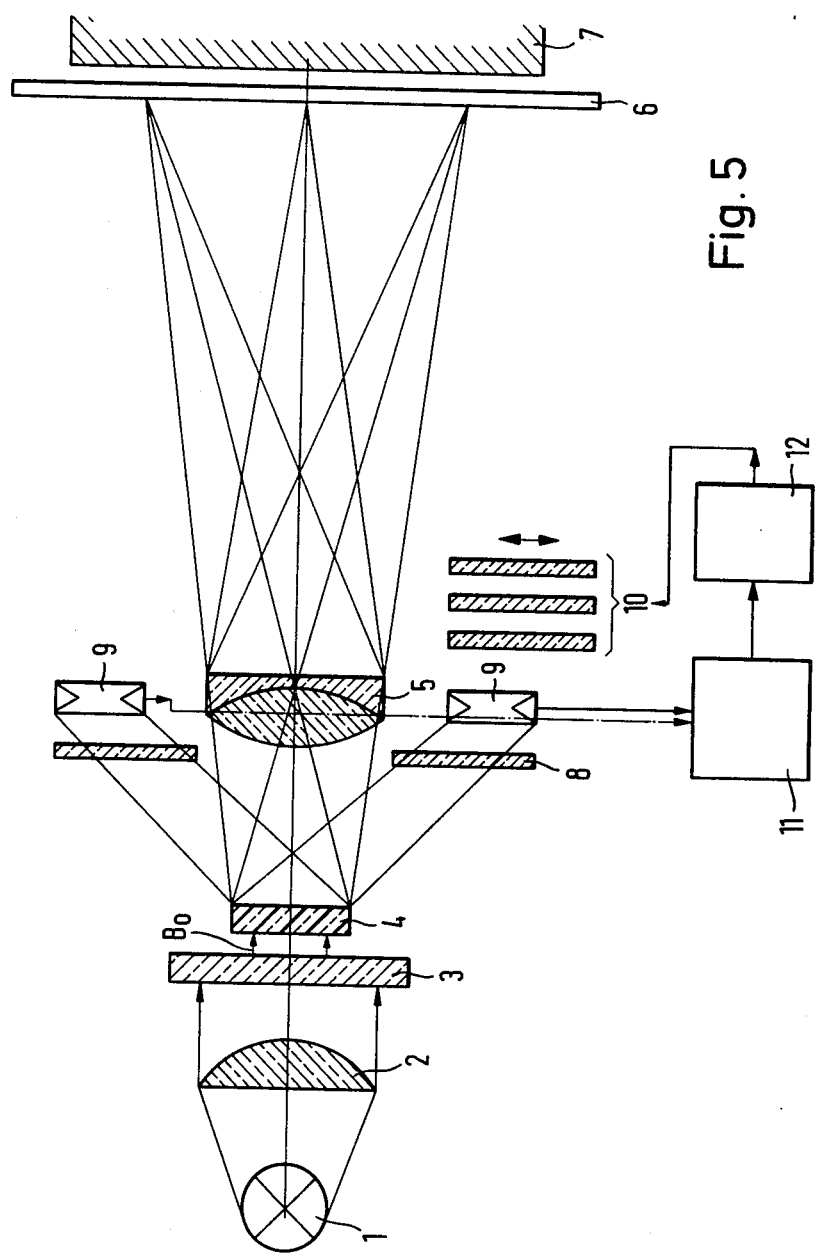
FIG. 5 is a simplified sketch of a printer according to the invention.

FIG. 5 is a basic diagram of a printer for carrying the process according to the invention into effect. A light source 1 emits substantially white light which is directed by a condenser 2 on to a ground-glass disc 3, the light from disc 3 is incident on an original 4 to be printed at an intensity $B_o$. An imaging lens 5 projects light from the original 4 on to printing material 6 on a support 7. The stray light is emitted by the original 4 is measured by photo-receivers 9 arranged on a graduated circle around the lens 5, a colour separation filter 8 being placed before each photo-receiver. Basically, there are three photo-receivers for the colours red, green and blue; to ensure uniform measurement this trio can be provided a number of times around the circle. The stray light produces in each photo-receiver a photo current which is fed to an exposure timer 11 which produces timing pulses for a filter control 12 controlling three shutter filters 10.

The apparatus shown in FIG. 5 operates as follows:

Normally the filters 10 are in the pivoted-in position in the path of the beam to the lens 5 and therefore prevent exposure of the printing material 6. The photo-receivers 9 analyse the original 4. In response to a start instruction given to the exposure timer 11, the filters 10 pivot out of the beam path together so that exposure can proceed. The timer 11 computes the exposure time required for each colour component of the exposure in accordance with the density of the original 4 and transmits for each of the three measurements a correspondingly timed control signal to the filter control 12 which amplifies the signals and, upon termination thereof, causes each of the three filters 10 to return to the normal position.

The filter construction shown in FIG. 5 is in general use in automatic printers using subtractive exposure techniques. A particularly advantageous feature of the apparatus according to the invention resides in the exposure timer 11, details of which are shown more fully in FIG. 6. The three photo-receivers 9 behind the filters 8 convert the light from the original 4 into photo currents $I_R$, $I_G$, $I_B$ which logarithmic amplifiers 14 convert into voltages $U_R$, $U_G$, $U_B$ proportional to the densities $D_{VR}$, $D_{VG}$, $D_{VB}$ of the original for the particular colour separation (R,G,B) technique used. Appropriate circuitry for logarithmic amplifiers is disclosed in the U.S. Pat. No. 3,482,916. The voltages $U_R$, $U_G$, $U_B$ are applied to resistances 17 connected to the inverting input of operational amplifiers 15 which have negative feedback via resistances 16 to these inverting inputs. In all, each operational amplifier acts as an inverting amplifier. The output signals $-U_{ER}$, $-U_{EG}$, $-U_{EB}$ are applied to exponential amplifiers 20, triggered by a start stage 21, to provide signals of duration $t_{ER}$, $t_{EG}$, $t_{EB}$ which, via the filter control 12, determine the opening time of the filters 10 (The filters themselves are complementary in colour to the separation filters—i.e., a CYAN filter is required for the red channel, a purple filter for the green channel and a yellow filter for the blue channel). Exponential amplifiers 20 and a start stage 21 are disclosed in the aforementioned U.S. Pat. No. 3,482,916 and the Swiss Pat. No. 455,913. By way of other resistances 18 the operational amplifiers 15 receive from a switching unit 13 parameter signals to standardize the exposure time $t_E$, for instance, so that a quite definite exposure time $t_E$ is produced in each colour channel for a particular density of the original 4. So far the circuit arrangement described corresponds to that disclosed in U.S. Pat. No. 3,482,916.

That part of the invention which goes beyond the prior art resides in the switching unit. The unit 22 comprises six operational amplifiers 23 to 28, seven fixed resistances $30_R$, $30_G$, $30_B$, 31–34, four variable resistances 35–38, two potentiometers 39, 40 and four diodes 42–45. The unit 22 is "seen" by the input terminals 46–48 and output terminal 49 as a non-linear network. The operational amplifier 23 in cooperation with the resistances 30, 31 adds up the three colour signals $U_R$, $U_G$, $U_B$ to form the density signal $U_D$ (as a rule the resistances $30_R$, $30_G$ and $30_B$ can have different values to give different weighting to the component colours). So far the circuit arrangement operates strictly linearly. Non-linear behaviour of the unit 22 is the result of cooperation of the operational amplifier 24 and resistances 32–34 with the four operational amplifiers 25–28, associated resistances 35–38 and diodes 42–45. The inverting input of the operational amplifier 24 represents a virtual earth point.

Figure 7:
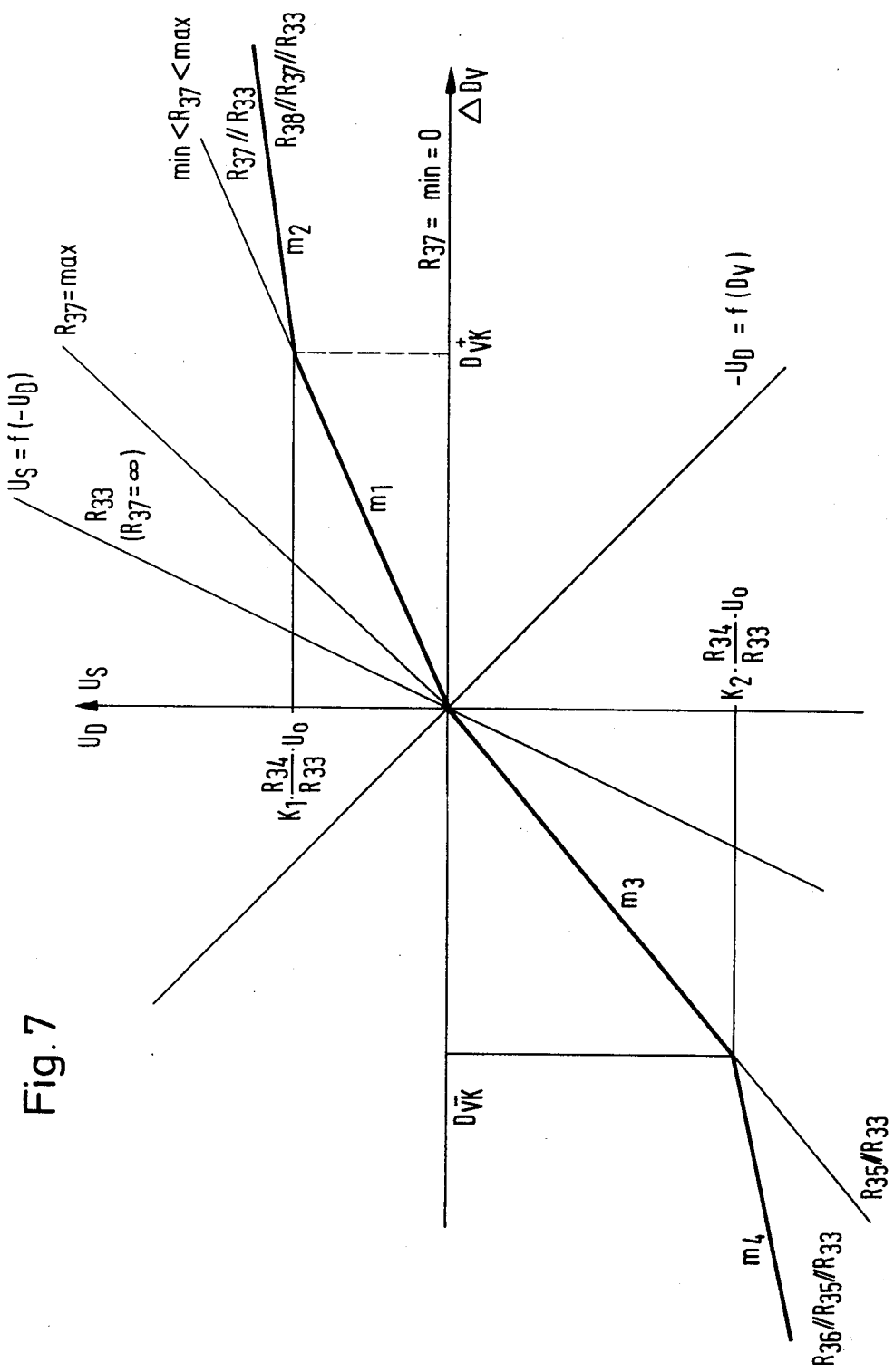
FIG. 7 is a diagram which helps to explain the operation of the exposure control system.

The operation of this part of the complete unit 22 can be understood if reference is made to FIG. 7. It will be assumed that the output voltage of the operational amplifier 23 has been zero adjusted with the standard or reference original in the apparatus. This can readily be achieved by corresponding level shifts in the logarithmic amplifiers 14 by means which are not shown.

The signals $U_R$, $U_G$, $U_B$ therefore represent variations in density of the original to be printed from the density of the standard or reference original, hereinafter called the "standard". If there has been an appropriate choice of sign, the latter signals are positive for an actual density greater than the standard density, negative in the opposite case and zero if the two densities are equal. The straight line $-U_D = f(D_v)$ represents this relationship in FIG. 7.

When the voltage $-U_D = 0$ volt, no current flows through the resistances 32, 33, and so there is zero potential at the inverting inputs of the operations amplifiers 25, 27. Because of the way in which it operates, the operational amplifier compares this potential with the earth potential at the non-inverting input. Theoretically the difference is zero, but in practice every operational amplifier, hereinafter abbreviated to OPA has a small offset voltage of a few mV and therefore has a definite tendency to flip-flop into a state of positive or negative saturation.

In the case of the OPA's 25, 27, the effect of the negative feedback and of the diode 42 or 44 is to maintain the inverting input at zero potential when $-U_D = 0$ volts. OPA 26 has positive bias applied to its noninverting input, and so its input voltage is negative and its output voltage is equal to the positive saturation voltage. The diode 43 therefore becomes non-conductive.

OPA 28 has its non-inverting input connected to a negative reference voltage, its input voltage is positive and its output voltage corresponds to the negative saturation voltage. Diode 45 is therefore non-conductive.

In all, current flows through none of the resistances 35–38; consequently, the output voltage $U_S$ of OPA 24 is, like the signal voltage $-U_D$, 0 volt.

When the density of an original is greater than the density of the standard, the output voltage $-U_D$ of OPA 23 becomes negative, and so a negative d.c. voltage is operative at the connecting point between the resistances 32, 33 and drives OPA 25 into positive saturation, so that diode 42 cuts off and the resistance 35 still has no current flowing through it.

OPA 26 delivers an output voltage, between zero volt and $+U_o$ volts, which has a positive value varying with the tap of potentiometer 39. Diode 43 cuts off and so no current flows through resistance 36.

Because of the negative feedback OPA 27 maintains the cathode of diode 44 at earth potential and in consequence resistance 37 is effectively in parallel with resistance 33. By means of the variable resistance 37 the output voltage $U_S$ can be varied as a function of $-U_D$ between a maximum and zero volt—i.e., the slope $m_1$ of the straight line which represents $U_S$ as a function of $-U_D$, can be adjusted. FIG. 7 shows these straight lines for various values of the resistance 37. The considerations and statements apply only for negative signal voltages $-U_D$.

Because of the negative feedback OPA 28 maintains its output voltage at the value determined by the potentiometer 40 somewhere between zero volt and $-U_O$ volt. While the voltage at the connection between the two resistances 32 and 33 is less negative than this reference voltage, diode 45 is non-conductive and no current flows through resistance 38. However, when the voltage at the connecting point becomes more negative than the reference voltage, diode 45 starts to conduct. In this voltage range the resistance 38 is effectively in parallel with the resistances 33, 37-i.e., the straight line for $U_S$ is flattened further in FIG. 7. The point at which the flattening starts in the $U_S/D_V$ diagram can be calculated from the ratio of the resistance R34 to the resistance R33. If this ratio has specially been made unity, the flattening starts at $U^+{}_{SK} = K_1 \cdot U_o$ when $K_1$ denotes the ratio of the voltage on the slider of the potentiometer 40 to the total voltage $U_o$. As a rule, $U_{SK}{}^+ = K_1 \cdot (R34/R33) \cdot U_o$. The diode 45 of OPA 28, unlike the diode 44 of OPA 27, is not included in the negative feedback branch to produce a smooth or rounded transition to the flat part of the curve. The steepness $m_2$ of this part is determined by the parallel arrangement of the three resistances 33, 37, 38 and therefore depends upon $m_1$—i.e. $m_2$ cannot be determined unequivocally by R38. This is no great disadvantage in practice since $m_1$ for any given system once set up usually undergoes very little further variation. Exactly the same considerations as for positive density variations from the standard-i.e., negative voltages $U_D$-apply to the converse case of negative density variations. In this event the OPA's 27, 28 cease to be effective; instead the OPA's 25, 26 come into action, the latter with effect from a voltage $K_2 \cdot U_o$ at the connecting point between the resistances 32, 33 corresponding to an output voltage $U_{SK}{}^- - K_2 \cdot (R34/\pounds 33) \cdot U_o$.

Resistance 35 in cooperation with resistance 33 determine the steepness $m_3$ in FIG. 7, and resistance 36 in cooperation with the resistances 35, 36 determines the steepness $m_4$ in the range $-U_S < U_{SK}{}^-$.

The following values have been found advantageous for practical purposes:

| | |
|---|---|
| $0.8 \leq m_1 \leq 1.2$ | $30° \leq \gamma_N{}^+ \leq 60°$ |
| $0 \leq m_2 \leq 0.3$–$0.4$ | $0° \leq \gamma_U \leq 20°$ |
| $0.8 \leq m_3 \leq 1.2$ | $30° \leq \gamma_N{}^- \leq 60°$ |
| $0 \leq m_4 \leq 0.4$–$0.6$ | $0° \leq \gamma_O \leq 30°$ |
| $\Delta D_{VU} = D_{VU} - D_{VN} = 0.6$–$1.0$ | |
| $\Delta D_{VO} = D_{VO} - D_{VN} = 0.4$–$0.7$ | |

The output voltage $U_S$ of OPA 24 is applied via three resistances 19 to one each of the OPA's 15 and is added to their input to the corresponding colour and parameter information. Positive voltages $U_S$ lengthen the exposure time $t_E$. If the resistances 19 are of the same value as one another, a change in the value of $U_S$ has exactly the same reaction on the exposure time in all three colour channels, so that there is a variation in density without colour shift on the printing material.

It has been found by experience in printing transparencies an advantage to correct mainly for density but to make only slight changes for colour correction, e.g. of something like 20% of the density corrections. The relationship between density correction and colour correction can readily be adjusted by choosing the appropriate relationships between the resistances 17 and 19. In the example mentioned, the resistance 17 should be about five times greater than the resistance 19. The resistances 17 and 19 (or more simply the resistance 34) could of course be variable resistances.

If the bend in the $U_S$ curve at the normal point is not required, the OPA's 25, 27 and associated circuit elements 35, 37, 42, 44 can be omitted, in which case $m_1 = m_3$ is determined by the resistance 33 alone if, as has been tacitly assumed so far, the resistances 32, 34 are fixed values.

In special cases it may be desirable to obtain the density information other than by equally weighted evaluation of the colour information, in which event the three resistances 30 should differ appropriately in value from one another.

Figure 6:
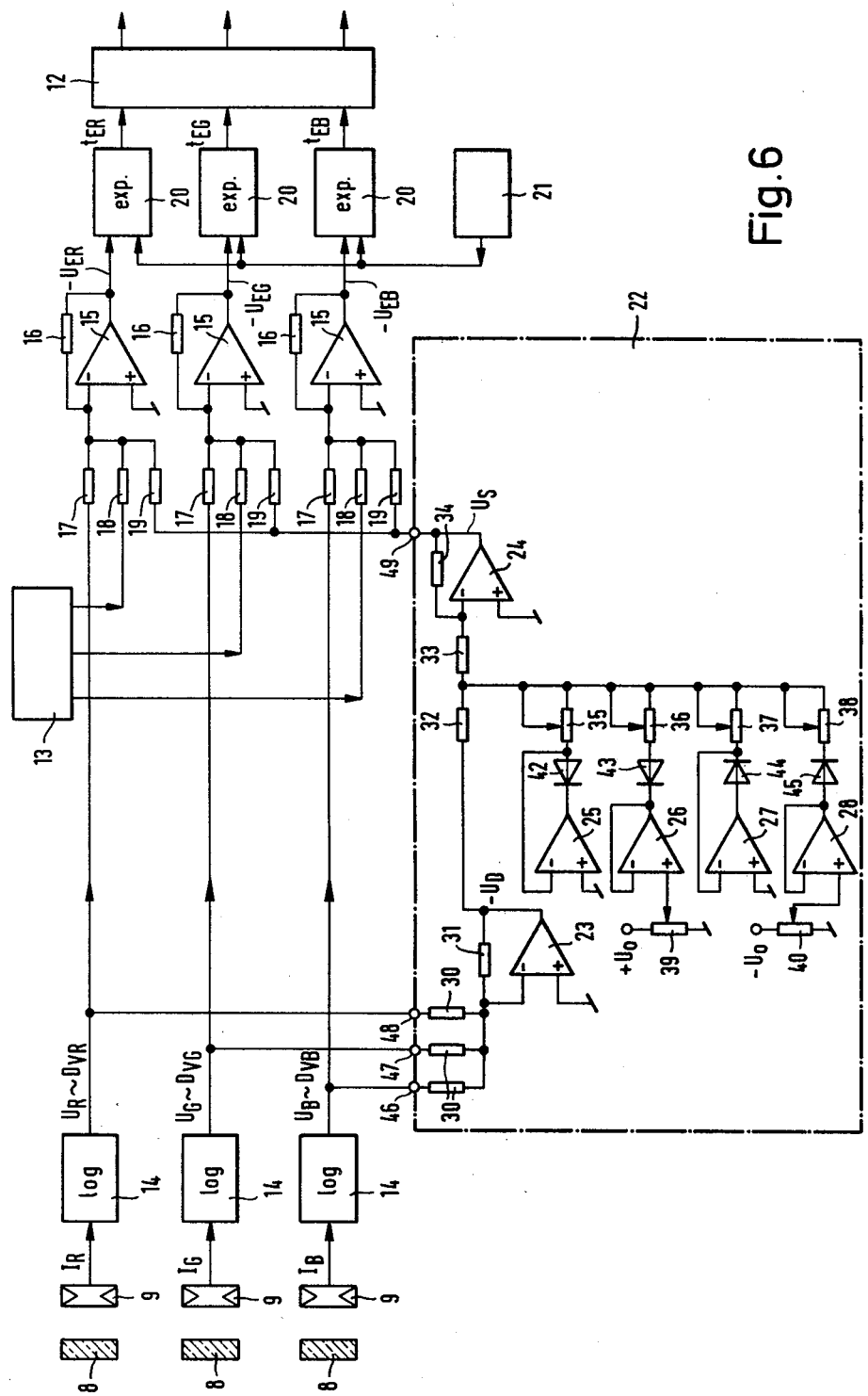
FIG. 6 is a block schematic diagram of the exposure control system of the printer of FIG. 5.

The apparatus according to the invention can be used to print very underexposed transparencies by compensating to some extent for the shortening of the exposure time by increased intensity of illumination to modify the slope of the curve $m_2$ in FIG. 7. As a rule, the light sources in printers are operated at from 10 to 20% below their rated voltage so as to increase their working life. In exceptional cases when it is required to print very underexposed transparencies, the voltage of the light source can be raised to its rated value. The following action must then be taken. Suitable means for performing this function are shown in FIG. 6.

It must be realized that this operation affects the slope of the curve $m_2$, and this adjustment of the slope can be carried out by a comparator 100 which provides an enabling signal when the potential at the point of connection of resistors 32 and 33 becomes more negative than the output signal of OPA 28.

The density signal $-U_D$ must be stored, e.g., by means of a sample-and-hold circuit 101 controlled by the comparator 100, before the lighting is increased and kept in store for the duration of the exposure (the additional light reacts on the measuring system in the same way as a reduction in the density of the original, so that the $U_S$ curve might drop back to the sections $m_1$, leading to unstable operation with hunting between $m_1/m_2$) and, the set-value voltage for the lamp control circuit (which normally keeps the printing light constant) should be changed from the rated value. This can be carried out by an electronic switch 102 controlled by the comparator 100.

The practical circuit steps needed to carry these features into effect are within the ability of one skilled in the art. One practical circuit arrangement is shown in FIG. 6A.

Figure 6A:
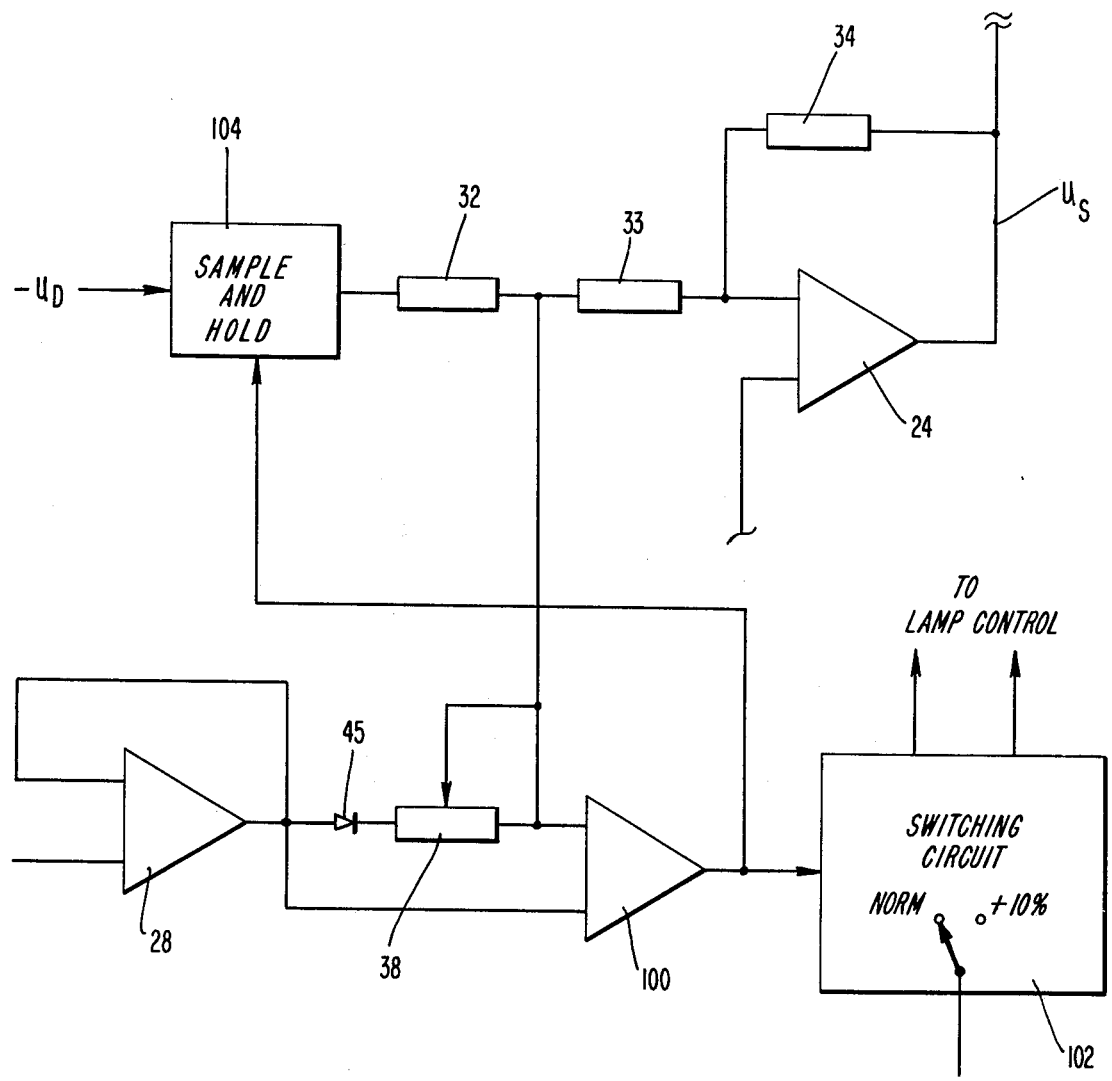
FIG. 6A is a block diagram illustrating one form of an underexposure correcting feature according to the invention.

Referring to FIG. 6A, the underexposure condition represented by the flattening of the $U_S$ curve portion $m_2$ can be detected in any suitable conventional manner by sensing the condition of operational amplifier 28 as with a conventional comparator 100. The comparator 100 detects a severe underexposure condition and provides a suitable output signal.

In order to raise the set-value voltage of the lamp control circuit to its rated value (e.g., an increase of 10%), a suitable switching circuit 102 receives the signal from the comparator 100 and changes the set-value voltage to the rated value when this output signal indicates that a threshold underexposure condition has been exceeded.

Also, as was previously mentioned, changing the lamp intensity will affect the density signal $-U_D$ so this signal is stored and held before the change in lamp intensity occurs. One conventional way of accomplishing this store and hold function may be by sampling and holding the $-U_D$ signal with a conventional sample and hold circuit 104 when the comparator 100 detects the threshold underexposure condition.

What is claimed is:

1. A process for controlling exposure in the direct printing of transparencies on to a print material comprising:
   (1) determining the difference in neutral density between an original transparency to be printed and a reference transparency;
   (2) establishing a first positive limit and a second negative limit for the determined density difference;
   (3) for the proportion by which the density difference exceeds the first positive limit, increasing the time during which the original transparency is exposed to printing light for printing on a print material by a predetermined amount which is less than the amount of increase in exposure time required by a positive density difference below said first positive limit; and
   (4) for the proportion by which the density difference is less than the second negative limit, decreasing the time during which the original transparency is exposed to printing light for printing on a print material by a predetermined amount which is less than the amount of decrease in exposure time required by a negative density difference above the second negative limit.

2. A process according to claim 1, wherein the first positive limit is between 0.6 and 1.0 density units.

3. A process according to claim 1, wherein the second negative limit is between 0.4 and 0.7 density units.

4. A process according to claim 2, wherein the proportionality factor between the logarithm of the exposure time lengthening and that proportion of the density difference which exceeds the first limit is between 0 and 0.4.

5. A process according to claim 3, wherein the proportionality factor between the logarithm of the exposure time shortening and that proportion of the density difference which falls short of the second limit is between 0 and 0.6.

6. A process according to claim 1, wherein the proportionality factor between the exposure time alteration and the density difference is greater for positive differences than for negative differences.

7. A process for controlling exposure in the direct printing of colour transparencies according to claim 1, wherein the density of the originals to be printed is determined for each of the three primary colours and the neutral density is obtained by weighted addition of the three colour densities.

8. A process for controlling exposure in the direct printing of colour transparencies according to claim 7, wherein the exposure is controlled both for colour balance and for overall brightness and colour variations are corrected much less than density variations.

9. A process according to any of the previous claims, wherein for originals in which the density difference exceeds the first limit, the intensity of the printing light is increased during the exposure time.

10. An apparatus for printing transparencies, comprising a printing light source, a support for the original to be printed, a support for photo-sensitive reversal material, an imaging lens, servo-operated colour control filters and an automatic exposure control acting thereon, the exposure control comprising; first means for determining the colour densities of the original in the three primary colours; second means for determining the neutral density of the original to be printed; third means which lengthen or shorten the exposure times in the three primary colours from the values for a reference original in dependence upon the variations of the neutral density and of the colour densities from the corresponding values of a reference original; and fourth means which respond to the difference between the neutral density of the original to be printed and the neutral density of the reference original and which oppose at least to some extent a further lengthening and/or shortening of the exposure time when such difference exceeds a first positive limit and/or falls short of a second negative limit.

11. An apparatus according to claim 10, wherein the fourth means produce a correcting signal which depends upon the neutral density of the original and which is proportional in steps to the neutral density difference, the proportionality factor for differences above the first limit and below the second limit being much smaller than for differences between the two limits; and the third means comprise three first adders which add the correcting signal, with predetermined weighting, to each of the three colour densities, determined by the first means.

12. An apparatus according to claim 10, including fifth means which increase the intensity of the printing light when the neutral density difference falls short of the second limit.

13. An apparatus according to claim 11, wherein the fourth means comprise: a second adder for forming the neutral density difference from the three variations of the colour densities from the corresponding values of the reference original; a third adder whose input is connected via a first resistance to the output of the second adder, such output being connected to one input each of the first adders; and threshold switches which are connected to the output of the second adder and which, when the neutral density difference exceeds the first limit, cut in a second resistance in parallel with said first resistance and which, when the difference falls short of the second limit, cut in a third resistance in parallel with said first resistance.

* * * * *